United States Patent [19]
Miyawaki

[11] Patent Number: 4,730,518
[45] Date of Patent: Mar. 15, 1988

[54] SYSTEM FOR THE TRANSMISSION RATIO OF A CONTINUOUSLY VARIABLE TRANSMISSION
[75] Inventor: Motohisa Miyawaki, Chofu, Japan
[73] Assignee: Fuji Jukogyo Kabushiki Kaisha, Tokyo, Japan
[21] Appl. No.: 912,936
[22] Filed: Sep. 26, 1986
[30] Foreign Application Priority Data
  Sep. 30, 1985 [JP]  Japan .................. 60-218398
[51] Int. Cl.$^4$ .................. B60K 41/18; B60K 41/12
[52] U.S. Cl. .................. 74/866; 364/424.1
[58] Field of Search .................. 74/866, 867; 364/424.1
[56]         References Cited
      U.S. PATENT DOCUMENTS
  4,369,675  1/1983  van Deursen .................. 74/864
  4,543,855 10/1985  Oetting et al. .................. 364/424.1 X
  4,584,907  4/1986  Niwa et al. .................. 74/866
  4,590,561  5/1986  Abo et al. .................. 364/424.1
  4,603,602  8/1986  Tanaka et al. .................. 74/866
  4,612,827  9/1986  Omitsu .................. 364/424.1 X
  4,622,865 11/1986  Itoh et al. .................. 364/424.1 X FOREIGN PATENT DOCUMENTS
  0180866 10/1983  Japan .................. 364/424.1
  0099147  6/1984  Japan .................. 74/867

Primary Examiner—Dirk Wright
Attorney, Agent, or Firm—Martin A. Farber

[57]          ABSTRACT

A control system for a motor vehicle provided with a continuously variable transmission which has a transmission ratio control valve having a spool for controlling the transmission ratio. During the acceleration of the vehicle, the transmission ratio is quickly reduced in a low vehicle speed range, whereby speed of an engine is kept low compared with a high vehicle speed range.

6 Claims, 6 Drawing Figures

SYSTEM FOR THE TRANSMISSION RATIO OF A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the speed of an engine in accordance with driving conditions of the vehicle.

A known control system for a continuously variable belt-drive transmission disclosed in U.S. Pat. No. 4,369,675 comprises an endless belt running over a drive pulley and a driven pulley. Each pulley comprises a movable conical disc which is axially moved by a fluid operated servo device so as to vary the running diameter of the belt on the pulleys in dependence on driving conditions. The system is provided with a line pressure control valve and a transmission ratio control valve. Each valve comprises a spool to control the oil supplied to the servo devices.

The transmission ratio control valve operates to determine the transmission ratio in accordance with the opening degree of a throttle valve of an engine and the speed of the engine. The line pressure control valve is adapted to control the line pressure in accordance with the transmission ratio and the engine speed. The output of an engine is transmitted to driving wheels of the vehicle through a clutch and the transmission. The line pressure is controlled to prevent the belt from slipping on the pulleys in order to transmit the output of the engine.

At the start of the vehicle, the transmission ratio is set at a maximum value. When an accelerator pedal is depressed to increase engine speed, the speed of the vehicle increases, keeping the transmission ratio at the maximum value. A line $l_1$ of FIG. 5 shows the increase of engine and vehicle speed. When the vehicle speed and engine speed reach set values under a driving condition, the transmission ratio starts to reduce (to upshift). After that, the transmission ratio is automatically and continuously reduced at a changing speed and engine speed and vehicle speed change along a line $l_2$ by operation of the driver of the vehicle.

During the upshifting, the engine speed is substantially constant or slightly increases. Generally, the engine speed, at which the transmission ratio starts to upshift, is set to a high speed, corresponding to a wide open throttle. Accordingly, the engine makes a loud sound in a range from a low vehicle speed to a high vehicle speed. In order to reduce the engine sound, if the engine speed is decreased to a line $l_3$, the acceleration characteristic at a high vehicle speed range decreases and the maximum vehicle speed at a maximum power is reduced.

SUMMARY OF THE INVENTION

The object of the present invention is to provide a control system which eliminates the above-mentioned problems.

The other objects and features of this invention will become understood from the following description with reference to the accompanying drawings.

DETAILED DESCRIPTION OF THE PREFERRED EMBODIMENT

Figure 1:
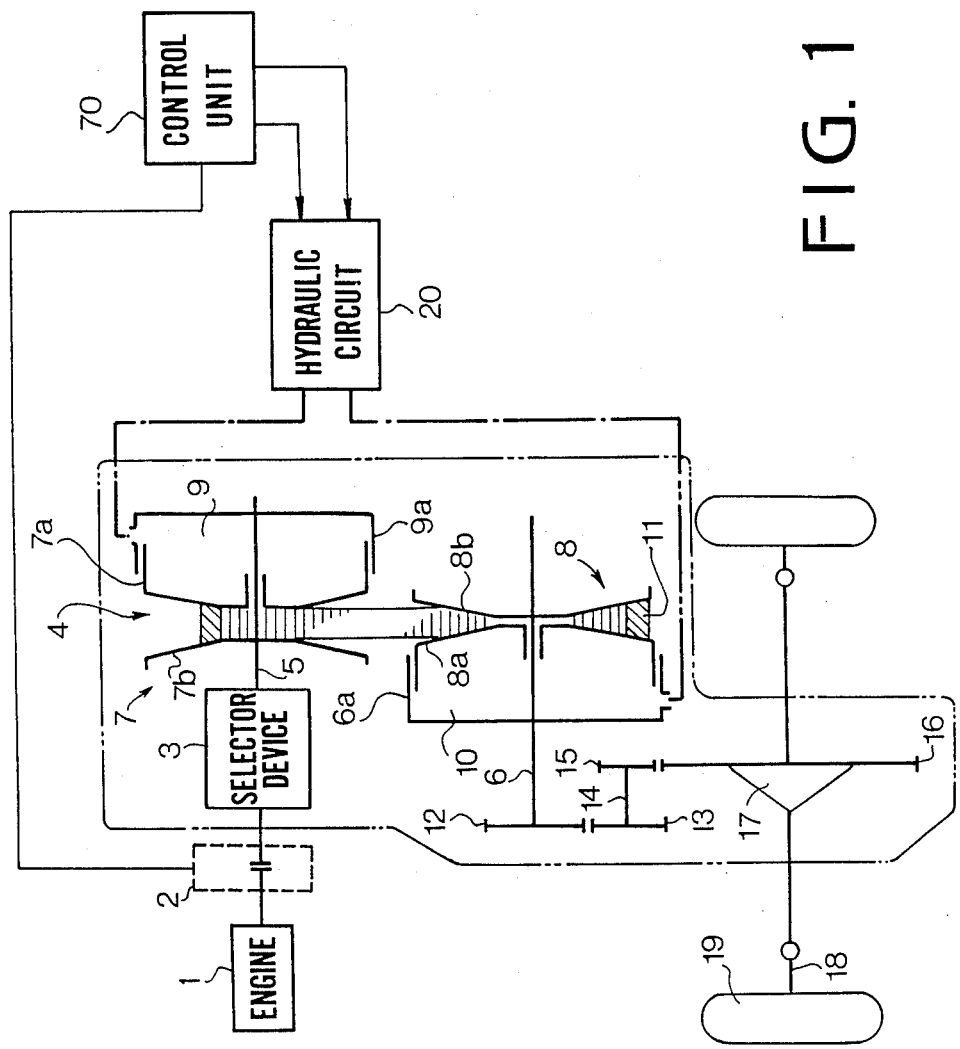
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector device 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
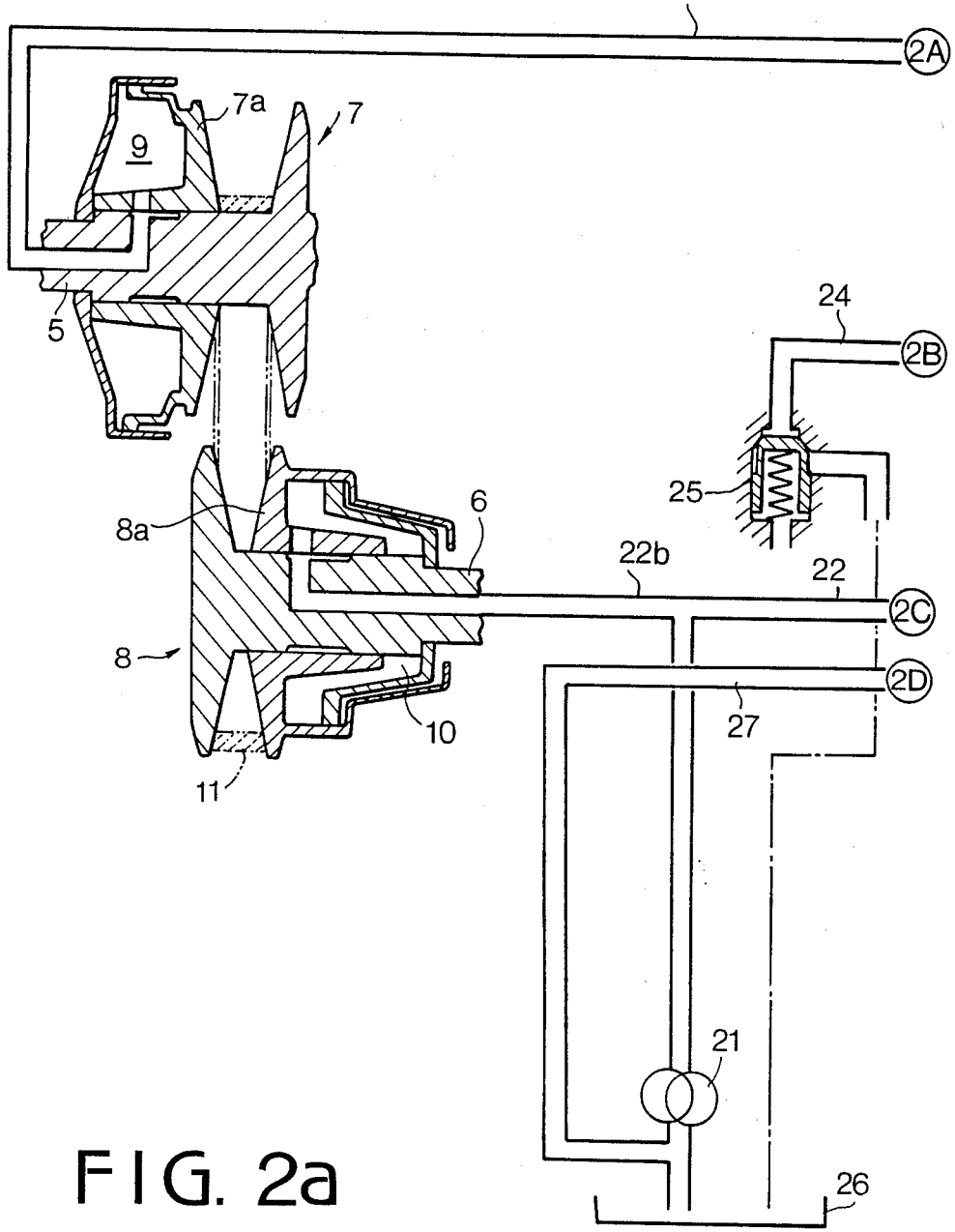
FIG. 2a and 2b are schematic diagrams showing a control system according to the present invention.
Figure 2B:
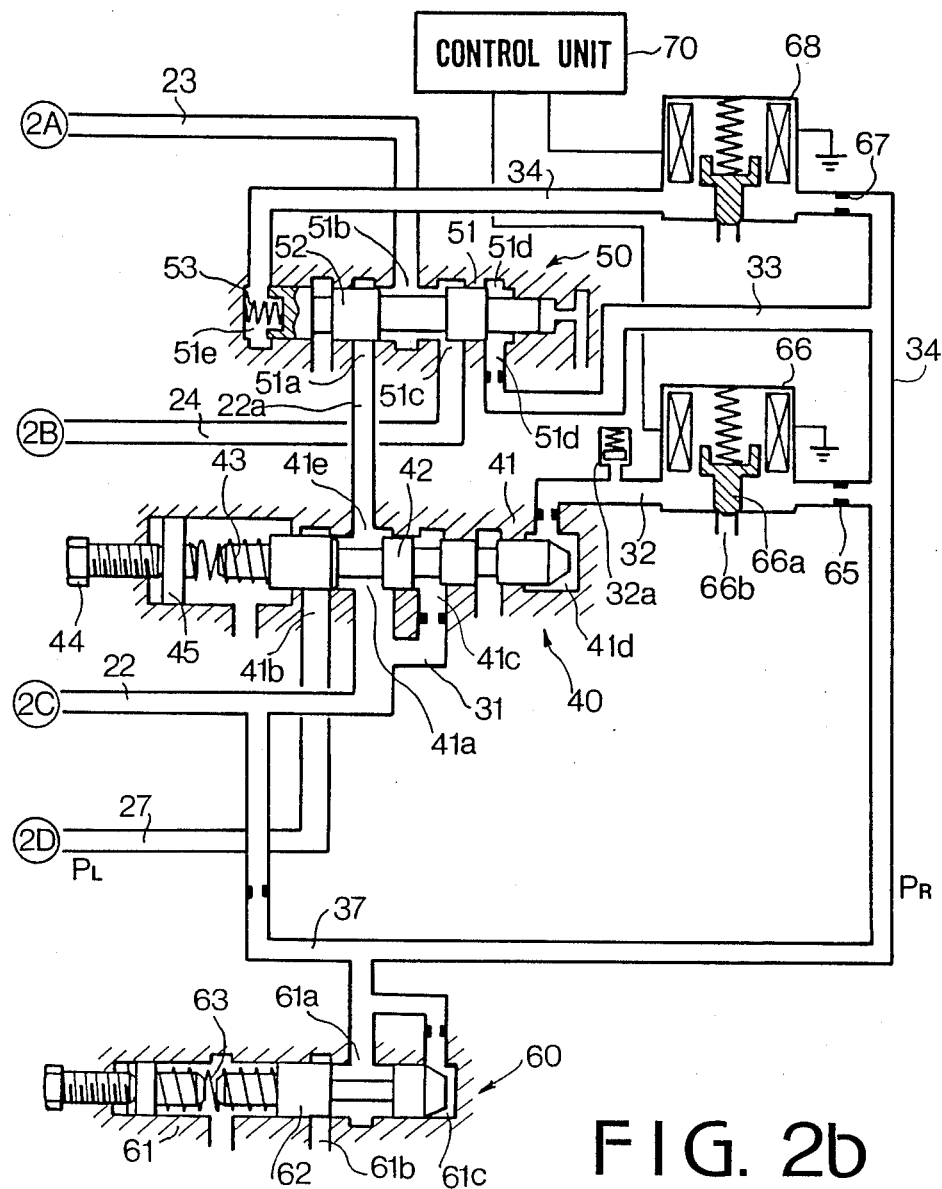

Referring to FIGS. 2a and 2b, chamber 9 of the drive pulley 7 is supplied with pressurized oil by an oil pump 21 from an oil reservoir 26 passing through a line pressure conduit 22, ports 41a and 41e of a line pressure control valve 40, transmission ratio control valve 50, and conduit 23. The chamber 10 of driven pulley 8 is applied with pressurized oil through a passage 22b without passing through valves 40 and 50. The movable conical disc 7a of the drive pulley 7 is so designed that the pressure receiving area thereof is larger than that of movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45 the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, spring 53 for urging the spool 52 in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with port 41e of line pressure control valve 40 through conduit 22a. The drain port 51c is communicated with the oil reservoir 26 through a conduit 24 and a check valve 25.

The system is provided with a regulator valve 60, and solenoid operated on-off control valves 66 and 68.

The regulator valve 60 comprises a valve body 61, inlet port 61a connected to the pump 21 through passages 37, 22, spool 62, end chamber 61c connected to the passage 37, spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through a passage 34, orifice 67, and solenoid operated on-off valve 68. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The solenoid operated control on-off valves 66 and 68 are operated by signals from a control unit 70. Thus, pressure controlled by the control valves 66 and 68 is applied to chambers 41d and 51e.

In the transmission ratio control valve 50, a pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of pulses for operating the control valve 68. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51e. Further, the speed of the movement of the spool 52 increases with decreasing of the duty ratio. The spool 52 is shifted to an oil drain position by decreasing the duty ratio. It will be understood that when the oil is supplied to the chamber 9, the transmission is upshifted.

Figure 3:
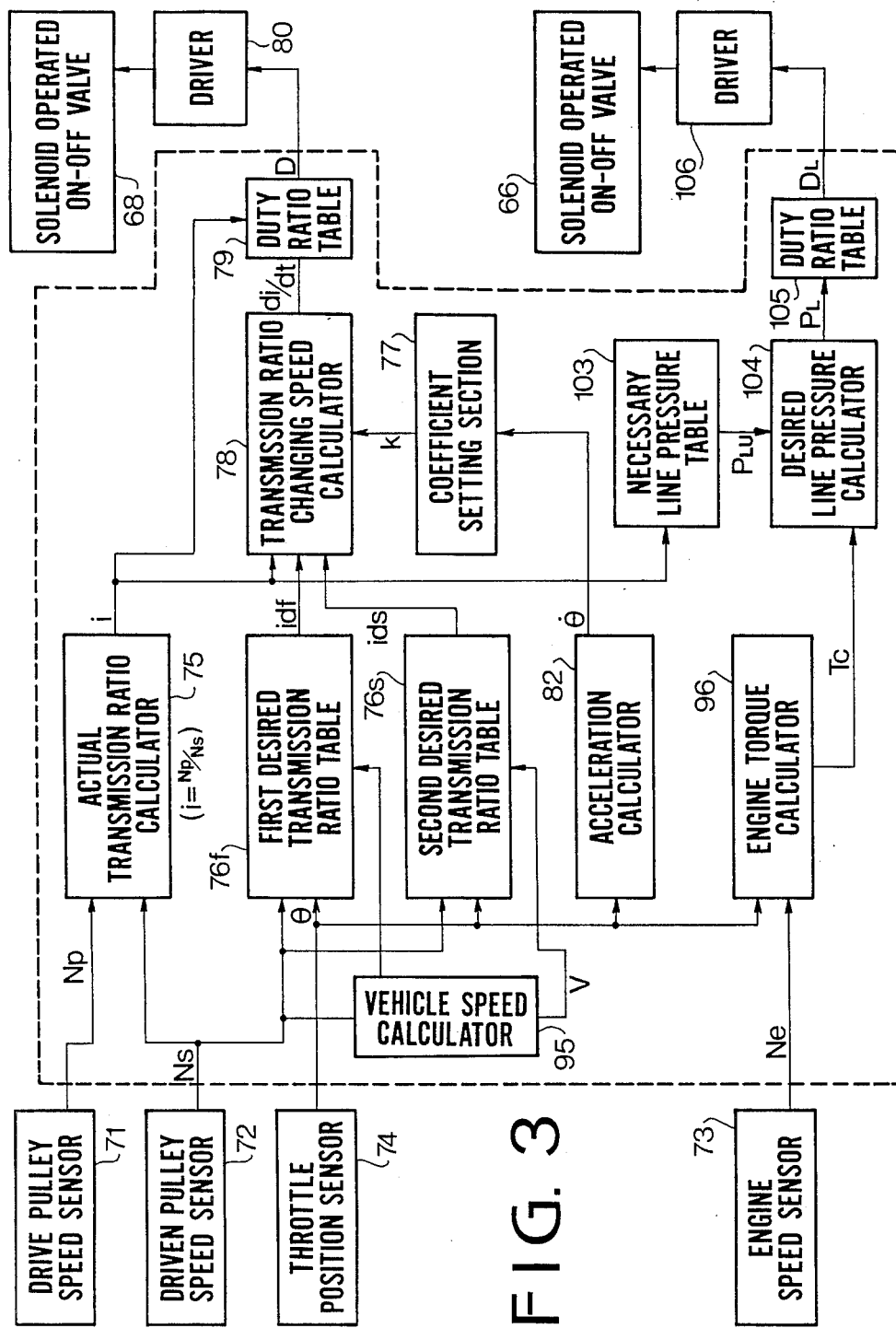
FIG. 3 is a block diagram showing a control unit.

Referring to FIG. 3, a drive pulley speed sensor 71, driven pulley speed sensor 72, engine speed sensor 73 and throttle position sensor 74 are provided. Output signals $N_p$ and $N_s$ of sensors 71, 72 are fed to an actual transmission ratio calculator 75 to produce an actual transmission ratio i in accordance with $i=N_p/N_s$. Output signal $N_s$ and output signal $\theta$ of the throttle position sensor 74 are fed to a desired transmission ratio table 76f for a low and middle vehicle speed range. A vehicle speed calculator 95 is provided for producing a vehicle speed signal V dependent on the output signal $N_s$ of the driven pulley speed sensor 72. A first desired transmission ratio idf is fetched from the table 76f in accordance with the signals $N_s$ and $\theta$ and the vehicle speed signal V.

Further, output signals $N_s$ and $\theta$ are fed to a second desired transmission ratio table 76s for a high vehicle speed range. A second desired transmission ratio ids is derived from the table 76s in accordance with the signals $N_s$, $\theta$ and V.

Figure 4:
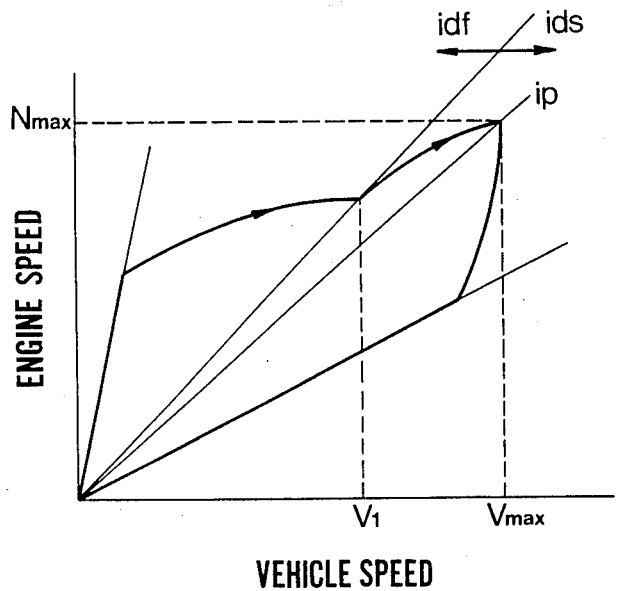
FIG. 4 is a graph showing the relationship between engine speed and vehicle speed in a control system according to the present invention.
Figure 5:
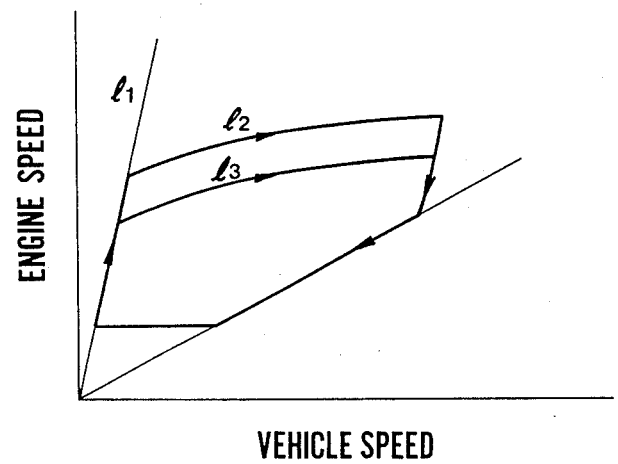
FIG. 5 is a graph showing the relationship between engine speed and vehicle speed in a conventional control system.

As shown in FIG. 4, the first desired transmission ratio idf is set to change in a lower vehicle speed range than the vehicle speed $V_1$ and the second desired transmission ratio ids is set to change in a higher vehicle speed range than the vehicle speed $V_1$. Further, the first desired transmission ratio idf is set to begin to upshift from a low engine speed and such that the engine speed increases slowly, and the second desired transmission ratio ids is set such that the engine speed rapidly increases to a maximum engine speed Nmax corresponding to a maximum vehicle speed $V_{max}$ at a set transmission ratio ip. On the other hand, the output signal is fed to an acceleration calculator 82 to obtain acceleration $\dot{\theta}$. The signal of the acceleration $\dot{\theta}$ from the acceleration calculator 82 is supplied to a coefficient setting section 77 to produce a coefficient K. The actual transmission ratio i, the first and second desired transmission ratios idf and ids and the coefficient K from the coefficient setting section 77 are applied to a transmission ratio changing speed calculator 78 to produce a transmission ratio changing speed di/dt from formulae $di/dt = -K(idf-i)$ or $di/dt = k(ids-i)$. When the value of di/dt is positive, the transmission must be downshifted and when the value is negative, upshifting must be done.

The speed di/dt and the actual ratio i are applied to a duty ratio table 79 to derive a duty ratio D. The duty ratio D is supplied to the solenoid operated on-off valve 68 through a driver 80. The duty ratio table 79 stores a plurality of duty ratios with respect to the middle ratio (50%). When di/dt is positive, a duty ratio smaller than 50% is derived to downshift, and when negative, a duty ratio larger than 50% is fetched to upshift.

On the other hand, the output signal $\theta$ of the throttle position sensor 74 and the output $N_e$ of the engine speed sensor 73 are fed to an engine torque calculator 96.

The actual transmission ratio i from the calculator 75 is applied to a necessary line pressure table 103 to derive a necessary line pressure $P_{LU}$ per unit torque. The necessary line pressure $P_{LU}$ and the engine torque signal $T_C$ from the calculator 96 are applied to a desired line pressure calculator 104 which calculates a desired line pressure $P_L$ which is slightly higher than a line pressure for transmitting the engine torque. The desired line pressure $P_L$ is expressed as follows:

$$P_L = P_{LU} \times T_C$$

The desired line pressure $P_L$ is applied to a duty ratio table 105 to derive a duty ratio $D_L$ corresponding to the line pressure $P_L$. The duty ratio $D_L$ is supplied to a driver 106 which operates the solenoid operated on-off valve 66 at the duty ratio.

In operation, while the vehicle is at a stop, chamber 10 of the driven pulley 8 is supplied with line pressure through passage 22b, and the chamber 9 of the drive pulley 7 is drained, since the $N_p$, $N_s$, $\theta$ are zero and duty ratio D is zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively, so that the electromagnetic clutch 2 is gradually engaged, transmitting the engine power to the drive pulley 7. The power of the engine is transmitted to the output shaft 6 at the largest transmission ratio by the driving belt 11 and driven pulley 8, and further is transmitted to the axles 18 of the driving wheels 19. Thus, the vehicle is started.

At that time the line pressure is at the highest value by the line pressure control valve 40, since the duty ratio for valve 66 is large, and the spool 42 of the line pressure control valve 40 is at the right end position. When the throttle valve is opened for acceleration, the actual transmission ratio i and transmission ratio changing speed di/dt are the calculated by calculators 75, 78, and the duty ratio D is obtained from the table 79. The value of the duty ratio D is larger than the neutral value, and the quantity of drain from the control valve 68 is large, so that the pressure in the chamber 51d of the transmission ratio control valve 50 is higher than the chamber 51e. Thus, the spool 52 is shifted to the left to communicate the port 51a with port 51b, so that oil is supplied to the chamber 9 through the conduit 23. On the other hand, duty ratio for the control valve 66 is reduced, thereby shifting the spool 42 of the line pressure control valve 40 to the left. The port 41a communicates with the port 41b of the drain passage 27. Thus, the line pressure reduces, and the transmission is upshifted, since oil is still supplied to the chamber 9 through the transmission ratio control valve 50. The downshift operation is performed in the reverse manner.

More particularly, the first desired transmission ratio idf and the second desired transmission ratio ids are calculated in accordance with vehicle speed V. When idf<i or ids<i, the transmission is upshifted. The transmission ratio changing speed di/dt is calculated from the terms k(idf−i) or K(ids−i). The duty ratio D corresponding to the speed di/dt is obtained from the table 79 in accordance with ± di/dt and i. The solenoid operated control on-off valve 68 is operated at the duty ratio D. Namely, the speed di/dt is determined by the difference id and i and the duty ratio D is determined by the speed di/dt and i. Accordingly if the desired transmission ratio id for upshifting is set to a large value, the speed di/dt and ratio D increase. The duty ratio D in the vehicle speed range lower than vehicle speed $V_1$, in which the transmission ratio is large, is comparatively large. Accordingly, the transmission ratio changing speed di/dt is high. In other words, the transmission ratio i decreases quickly with respect to vehicle speed, so that the engine speed is held to low value as shown in FIG. 4. Namely, even if the engine speed is held to a low value, the vehicle speed increases continuously.

When the vehicle speed becomes higher than $V_1$ in which the transmission ratio becomes small, the duty ratio D is small, and hence the changing speed di/dt is low. Accordingly, the transmission ratio is slowly reduced, so that the engine speed is raised by the depression of the accelerator pedal. In other words, unless the engine speed is increased, the vehicle speed reduces. Therefore, in order to accelerate the vehicle, the engine speed must be increased.

Thus, in accordance with the present invention, engine speed is held at lower speed in a low vehicle speed range. Accordingly, the engine does not make loud sounds. Since the engine speed is increased in a high vehicle speed range, the power characteristic of the transmission can be improved.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for a continuously variable transmission for transmitting the power of an internal combustion engine having a throttle valve to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, and a belt engaged with both pulleys, the control system having a transmission ratio control valve having ports and a shiftable spool, and a first hydraulic circuit having a pump for supplying oil to the first hydraulic cylinder via the transmission ratio control valve and to the second hydraulic cylinder, the improvement in the system comprising:

first means for detecting operating conditions of said engine and for producing a first signal;

second means responsive to the first signal for producing a second signal representing a desired transmission ratio for upshifting the transmission;

calculating means for producing an actual transmission ratio signal representing actual transmission ratio;

third means responsive to the second signal and to the actual transmission ratio signal for producing a third signal representing transmission ratio changing speed dependent on the difference between the desired and actual transmission ratio;

said second means sets the second signal to represent a higher transmission ratio changing speed when the transmission is in a large transmission ratio range below a predetermined vehicle speed, and said second means sets the second signal to represent a lower transmission ratio changing speed compared with said higher transmission ratio changing speed when the transmission is in a small transmission ratio range above said predetermined vehicle speed; and fourth means responsive to the third signal for shifting the spool of the transmission ratio control valve so as to reduce the transmission ratio at a transmission ratio changing speed determined by the third signal.

2. The control system according to claim 1 wherein the fourth means includes a second hydraulic circuit for supplying the oil to the transmission ratio control valve so as to shift the spool, and control valve means provided in the second hydraulic circuit for controlling the amount of the oil supplied to the transmission ratio control valve.

3. The control system according to claim 2 wherein the control valve means is a solenoid operated on-off valve.

4. The control system according to claim 2 wherein the second hydraulic circuit is provided with a regulator valve for maintaining the pressure of the oil in said second hydraulic circuit at a constant value.

5. The control system according to claim 3 wherein the fourth means includes means responsive to the third signal for producing a duty ratio signal for operating the control valve means.

6. The control system according to claim 1, wherein said transmission ratio changing speed is a change of the transmission ratio with respect to vehicle speed.

* * * * *